INVENTORS
AARON BARKMAN
MIKE S. FUJIMOTO
BURNHAM R. ORVIG

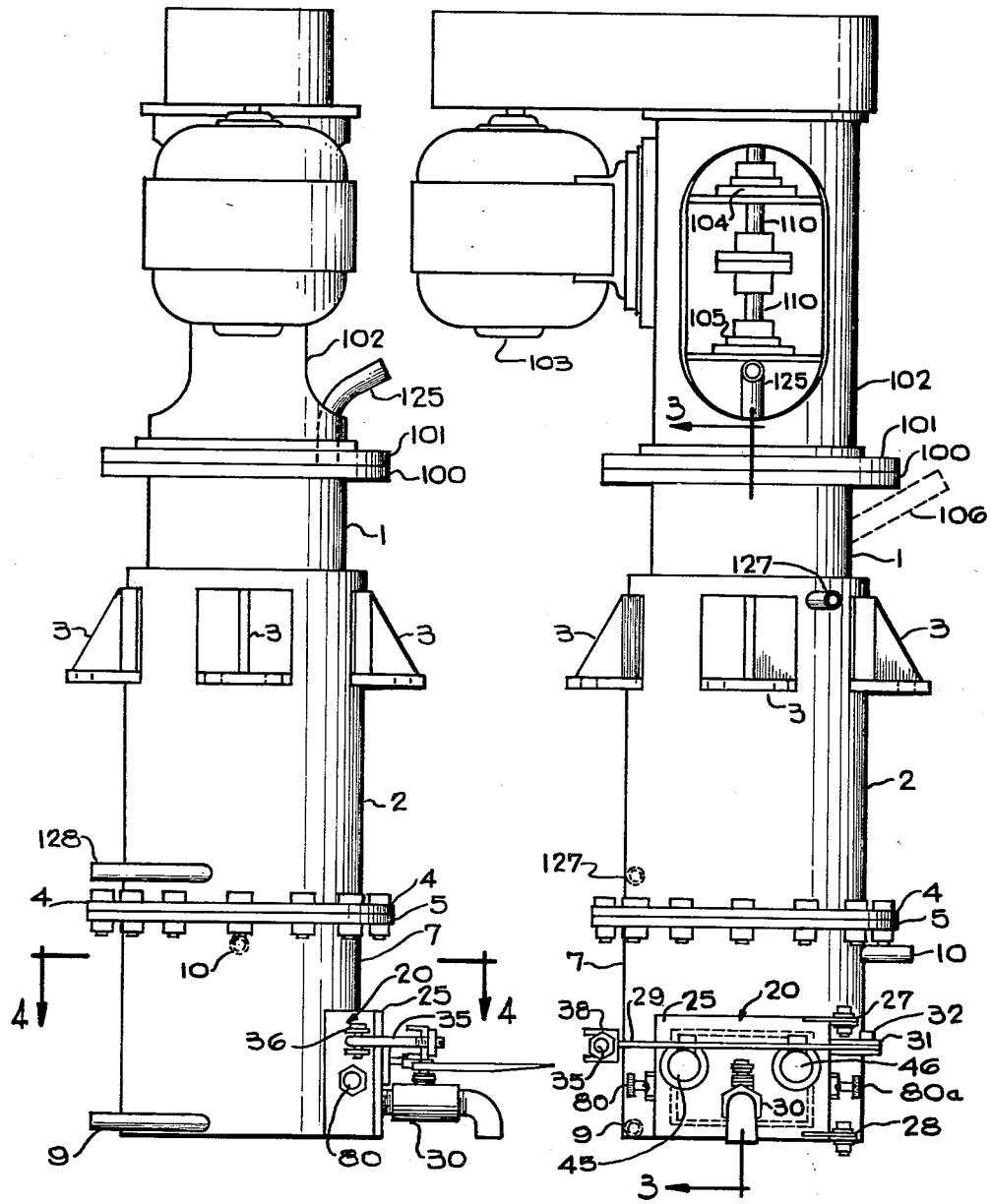

Aug. 21, 1962 A. BARKMAN ETAL 3,050,263
CONTINUOUS SMALL-BALL BALL MILL AND METHOD FOR
DISPERSING PIGMENTS IN LIQUID VEHICLES
Filed Jan. 14, 1959 4 Sheets-Sheet 3
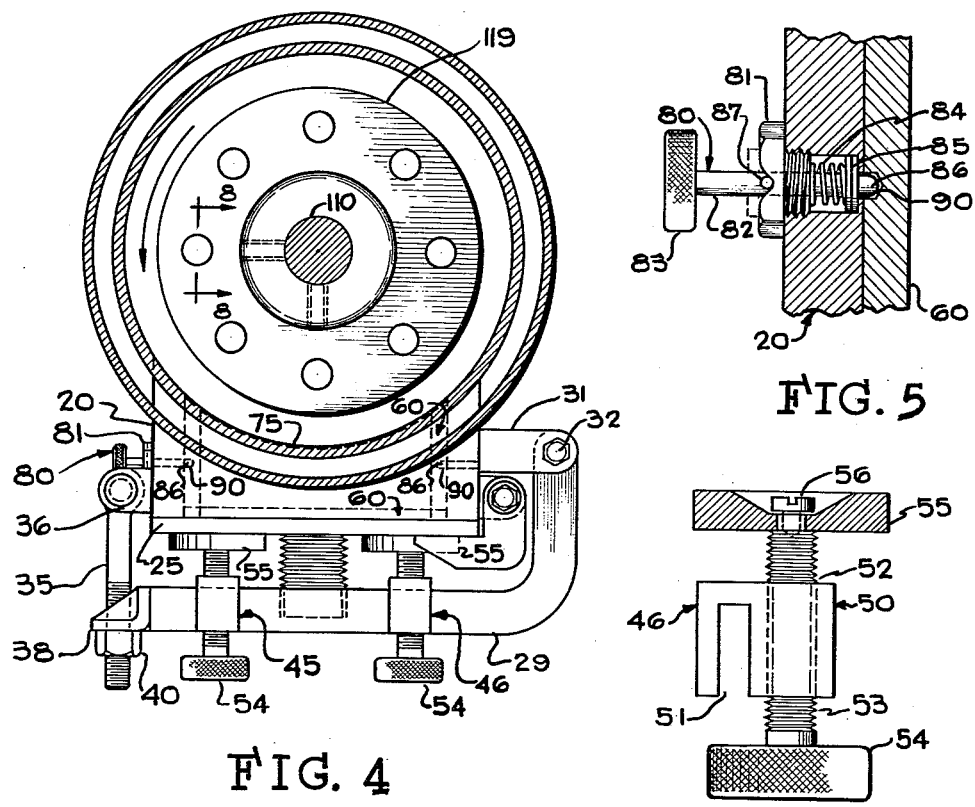
FIG. 4
FIG. 5
FIG. 6
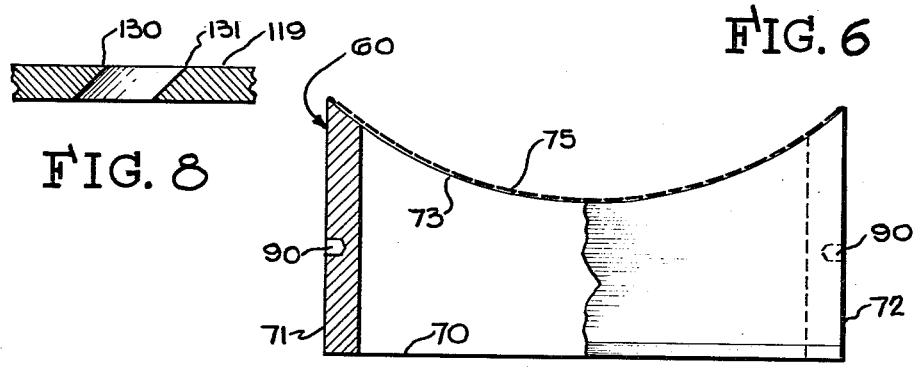
FIG. 8
FIG. 7
INVENTORS
AARON BARKMAN
MIKE S. FUJIMOTO
BURNHAM R. ORWIG
BY
Richard G. Smith
ATTORNEY Aug. 21, 1962  A. BARKMAN ETAL  3,050,263
CONTINUOUS SMALL-BALL BALL MILL AND METHOD FOR
DISPERSING PIGMENTS IN LIQUID VEHICLES
Filed Jan. 14, 1959  4 Sheets-Sheet 4

INVENTORS
AARON BARKMAN
MIKE S. FUJIMOTO
BURNHAM R. ORWIG by Richard G. Smith
their ATTORNEY

United States Patent Office 3,050,263
Patented Aug. 21, 1962

3,050,263
CONTINUOUS SMALL-BALL BALL MILL AND METHOD FOR DISPERSING PIGMENTS IN LIQUID VEHICLES
Aaron Barkman and Mike S. Fujimoto, Chicago, and Burnham R. Orwig, Crete, Ill., assignors to The Sherwin-Williams Company, Cleveland, Ohio, a corporation of Ohio
Filed Jan. 14, 1959, Ser. No. 786,783
11 Claims. (Cl. 241—30)

This invention relates to an improved ball mill which can be continuously operated to produce dispersions of pigments in liquids and to treat the pigmentary particles and their suspensions to improve and to increase their commercial usefulness.

Heretofore ball mills (including pebble mills) have been used to disperse pigmentary agglomerates in liquid vehicles. These units provide a large drum rotatable about horizontal trunnions at relatively low rates so that the balls will tumble through the pigment-liquid slurry placed within the drum. For the most part, ball and pebble mills require from 12 to over 100 hours to make a single batch of paint, ink or other pigment-liquid dispersion, depending upon the particular pigment and vehicle to be combined.

Vibratory ball mills have been more recently proposed, but because of the large masses involved, have not been shown practical in commercial production of pigment-in-liquid dispersions. However, they have been effectively adapted to laboratory and other small scale use.

Recently it has been proposed that Ottawa sand having a particle diameter of less than 20 to not more than 40 mesh (U.S. Standard Sieve) could be used in conjunction with a plurality of impellers to rotate the sand within a casing to disperse pigments in liquids which contained film-forming binder solids. The original mill and process described (U.S. Patent 2,581,414) was operative only with liquid vehicles containing film-forming solids. Further, the use was limited to grinding media of from 20 to 40 mesh, as larger diameter grinding media units were shown to be inoperative.

To separate the sand from the fluent dispersed product after milling, the sand unit first described required a screen extending 360° or completely around the base of the elongated vertical cylindrical unit in which dispersion was effected. Another chamber, concentric with the screen area, but formed exteriorly of the screened area, provided a collector ring chamber in which the dispersed product was collected.

In practice the novel sand mill is illustratively operated from about 1150 to about 1600 feet per minute linear peripheral speed of its impeller units. After relatively brief periods of operation, the separating screens used, of the order of 45 to 50% open area mesh, both plugged with sand and were abraded away, cutting down throughput rates in the one case and allowing sand to contaminate the liquid dispersion being produced in the second case. The units were operated by feeding a coarse pigment vehicle slurry into the top and the dispersed liquid or fluent product was removed from the collector chamber extending completely about the mill at the bottom.

The prior art apparatus was operable, but as the screening means was inaccessible in the bottom of the unit and cleaning and removal for replacement difficult and screen plugging (blinding) seriously impaired production rates, improved apparatus has been more recently described and claimed in U.S. 2,855,156 utilizing the sand as the grinding media as before, but providing a unit fed into the bottom of a much longer vertical cylindrical vessel. In the improved unit, a woven separatory screen extended completely about the mill periphery as before, but is placed at the top of the mill which mill is fed with coarse slurry from the bottom. By this means the screen has now been placed in position to be more readily serviced when blocked with sand, or removed and replaced when worn through. Additionally, by feeding the coarse slurry into the bottom of the unit, less sand is carried upwards to block the screen. Production rates are stated to be markedly increased, but many problems have also been introduced. Among these is the problem of slurry through-put rate. As the volume of through-put is increased, the relatively fine grinding media is lifted in the unit and as the concentration of grinding media increases in the top screen zone, plugging and blinding of the screen becomes more and more severe. As the top of the screen unit is open, any diminution in screen through-put without correlative shut down and decrease in the main stream flow through the mill unit endangers the operation with over-flow of slurry and contaminant sand out of the mill top and into the completed dispersion. If the top of the screen is sealed off, to allow operation under pressure as might be considered an obvious expedient, problems of wear at the common meeting of rotating shaft, screen and grinding media become most difficult. While the patentees indicate materials as heavy as 250 poises may be processed, extreme difficulty with upward movement of the grinding media to the screen area is experienced at viscosities appreciably above the usual viscosities of completed paints intended for subsequent brush application. Brushable paints are far below 250 poises in viscosity.

It is the object of this invention to provide a small-ball ball mill operable with nodular grinding media of larger size or diameter than is available in Ottawa sand to aid in overcoming the screen blinding problem.

It is further the object of this invention to operate a small ball mill (balls of the order of greater than 0.85 mm. but less than about 1.68 mm.) which will not plug or bind the screen during continuous operation, accomplished in part by moving the larger balls at a faster rate.

It is an additional object of the invention to provide a continuously operable small-ball ball mill which may be continuously fed with coarse slurries under pressures greater than atmospheric into the mill unit without undue plugging or blinding of the screen or leakage problems, thus, with consistent high volume output rates.

It is a further object of this invention to reduce the screen area heretofore thought essential to operation by use of slotted screens of less open area than standard screens and to provide ready access to the thus reduced screen area for ready replacement of worn screens when replacement is required.

Another object of this invention is to overcome the problems inherent in prior art devices due to screen problems by increasing the diameter of the grinding media and this, in combination with an improved screen having rectangular slotted perforations and higher peripheral impeller speeds, to overcome screen blinding and consequent reduction in production rate heretofor a limitation in the art.

Still another object of this invention is to provide a continuously operable small-ball ball mill which will disperse pigmentary solids in all liquids including water and volatile hydrocarbon compounds as well as in the varnishes and other film-forming liquid vehicles heretofore essential to the operation with 20–40 mesh Ottawa sand media units of the prior art.

These and other objects will appear more clear in the light of the following description in conjunction with the accompanying drawings, but the full advantages of the invention will be apparent only after its use in the field of dispersion of pigmentary solids in liquid carriers.

Referring in general to the drawings:

FIGURE 1 is a front view of the dispersing unit in complete assembly.

FIGURE 2 is a side view of the same unit.

FIGURE 4 is a plan view along the line 4—4 of FIGURE 2.

FIGURE 5 is a sectional view with parts broken away of means adapted to position parts of the apparatus illustrated in FIGURE 4.

FIGURE 6 is a view, partially in section, of a clamping unit.

FIGURE 7 is an enlarged view, partially in section, of the screen holder frame unit indicated in position in dotted lines in the detail of FIGURE 4.

FIGURE 8 is a fragmentary detail in section of a portion of one of the impeller units in its preferred form and as would be seen in FIGURE 4 along the line 8—8.

Figure 3:
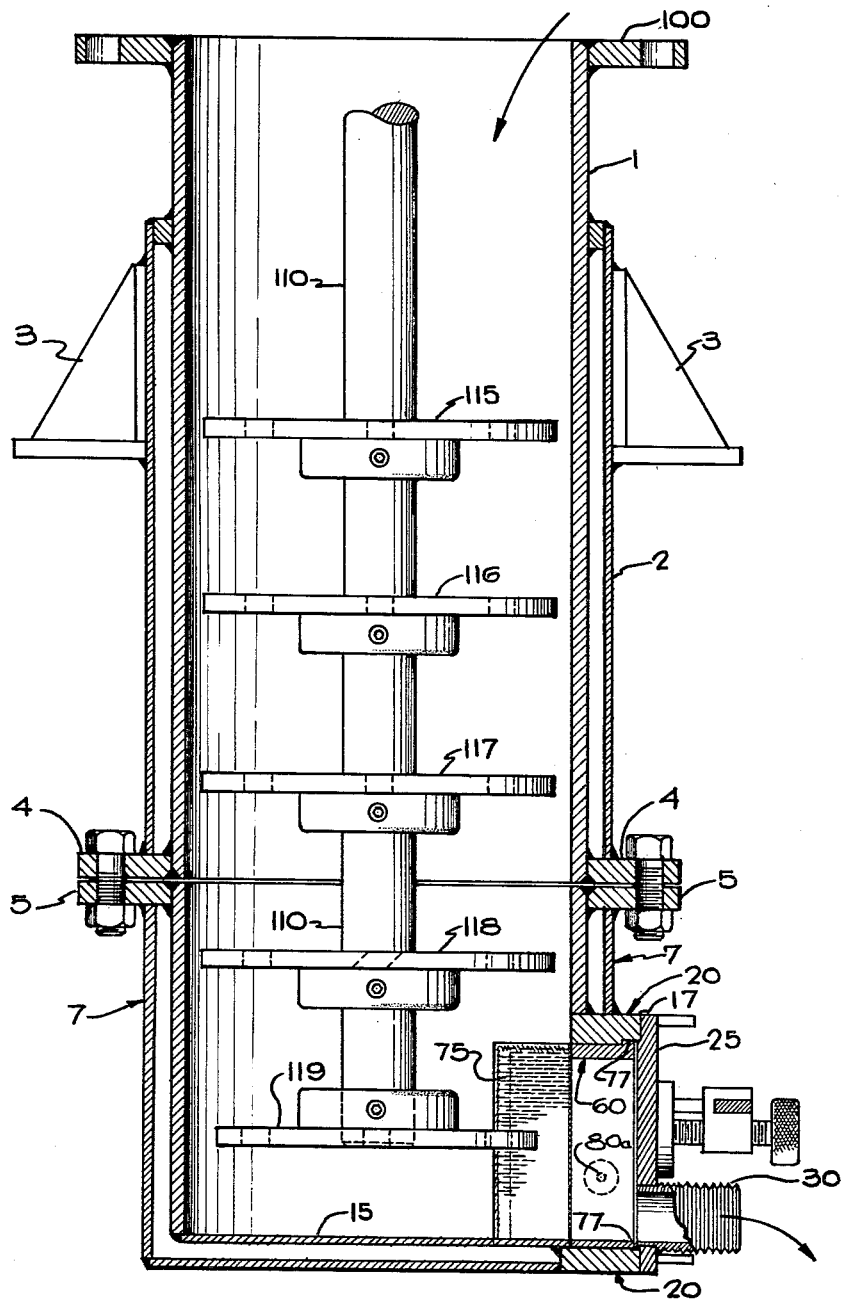
FIGURE 3 is a sectional side view with certain parts removed, along the line 3—3 of FIGURE 1.

Referring in greater detail to the drawings, an elongated cylindrical casing 1 is jacketed with a concentric shell 2 each spaced apart from the other and provided with means to supply temperature controlling fluids there between and to circulate and remove these fluids as necessary to temperature control within inner casing 1. A plurality of brackets 3 are disposed about and welded to the cooling jacket 2 to provide floor attached supporting means. The lower extreme of cylindrical casing 1 terminates in a lower flange 4 welded to jacketing shell 2 and casing 1 and adapted to easy disengagement with a like mating flange 5 forming the upper terminus of a closed, jacketed vessel 7, also provided with ingress and egress means into the surrounding jacket for temperature controlling fluids to be circulated therethrough at 9 and 10, controlling temperature within vessel 7.

Forwardly and flush with the inner bottom 15 of jacketed vessel 7 is a rectangular cut-out area of about 90° of arc (less than 180° of arc is sufficient) through the concentric walls of jacket 7 to which is rearwardly attached along lines of intersection a generally rectangular screen-receiving box or hatch-way 20 which extends outwardly from the vessel 7 to define an open hatch-way or entry-way to the common interior of casing 1 and vessel 7. The rectangular opening 17 of hatch-way 20 is closed with a rectangular mating-door 25 recessed about its periphery to provide sealing engagement with opening 17. Door 25 is pivotally supported on one side by hinges 27 and 28. Centrally of and along the base of door 25, a valved outlet 30 provides flow control means for egress of fluids from the interior of the jacketed cylinder 1 and vessel 7.

Also pivotally mounted outside of jacket 7, adjacent hinges 27 and 28, is door-bar 29, pivoting on bracket 31 and pin 32. When door 25 is in closed position in hatch-way 20, door-bar 29 is adapted to be swung into parallel relation but spaced apart from door 25. The opposite extreme end from pivot point 32 of door-bar 29 is provided with a slotted end 38 adapted to receive a threaded bolt 35, pivotally fastened to hatch-way 20 at 36. The threaded, free-end of bolt 35 is provided with nut 40, which serves by adjustment to retain the parallel relation between door-bar 29 and door 25 desirable to provide a most effective seal.

A pair of clamps 45 and 46, constructed as detailed in FIGURE 6, are fitted out with a slotted block 50, having a slot 51 adapted to slide horizontally along closing-bar 29. Parallel with slot 51 through block 50 is a threaded hole 52 adapted to receive threaded bolt 53 having a knurled head 54 at one end and plate 55 so mounted at the other end as to be rotatable about pin 56.

FIGURE 7 illustrates in some detail construction of slotted screen holder frame 60, adapted to be removed from and replaced in hatch-way 20 with a minimum of labor. In essence screen holder 60 comprises an open rectangular frame, the outer or front end 70 of which is square with the side walls 71 and 72. The rear portion of frame 73 is cut away in an arc of substantially the same radius as the inner radius of cylinder casing 1, but the side walls 71 and 72 of frame holder 60 are slightly less in dimension than the corresponding walls of hatch-way 20. This slightly shortened dimension provides the arcuate area 73 a slight set-back from the interior wall of casing 1 when screen-holder frame 60 is positioned in hatch-way 20 as shown in FIGURE 4. This slight setback has been found unexpectedly advantageous in reducing wear during operation of the grinding media on the screen 75.

Figure 9:
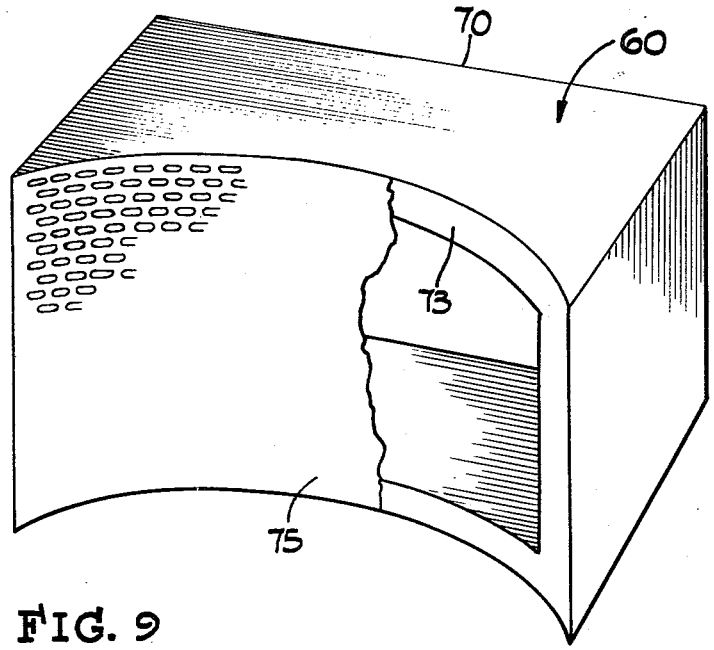
FIGURE 9 is an enlarged isometric view of the screen holder frame and screen as shown in FIGURE 7 with parts broken away.
Figure 10:
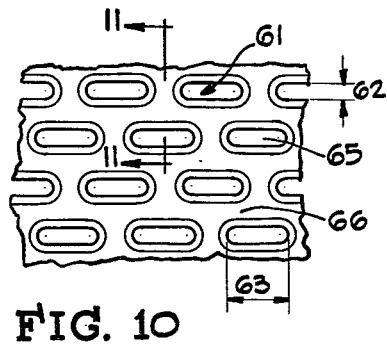
FIGURE 10 is an enlarged rear view of a portion of the screen as broken away from FIGURE 9.
Figure 11:
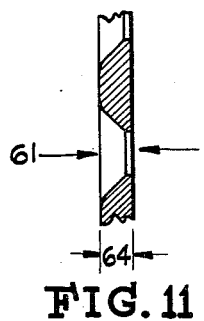
FIGURE 11 is a further enlargement of a section of the screen as shown in FIGURE 10 along the line 11—11.

Screen 75, as detailed in FIGS. 9, 10 and 11, is in essence a rectangular section of slotted screen having a pyramidal opening in cross-section (see FIG. 11) rolled to fit the arc 73 defined by the rear section of screen-holder 60. The slots 61 are in parallel relation to the plane of rotation of the impeller disks. The nature of screen 75 has been found particularly important and material to the successful operation of the small-ball ball mill dispersing unit and has been made of thin metallic sheet material having slotted perforations or open area 65, each slot of which should be at least about ten times longer 63 than its width 62 in order to allow maximum self-cleaning action of the moving grinding media. The thickness 64 of the screen is such that it is approximately the same as the slot width 62 and the open area 65 of the screen to the closed plate area 66 of the screen is of the order of 20 to 30% of the total screen area 75. This is at a variance with the usual woven screen which is of the order of 45 to 50% open area. Viewed in cross section (FIG. 11), each slot is of generally rectangular shape but is smaller on one side of the screen than the other. The slot width 62, of course, is always chosen to be smaller than the diameter of the grinding media selected. While the size (diameter) of the media is important, it has also been found that the differential between slot width and average diameter of the media should not be less than 0.35 mm. and preferably between 0.42 and 0.67 mm. It is understood that the gradation in slot size, from one face to the other of the screen, is provided by electro-plating techniques and a variety of durable metals including nickel may be used to produce the screen structure desired. It is also preferred to utilize nickel based perforated screen of the electrolytic class of screen described after it has been subjected to chromium diffusion as is now commercially available. While other more standard qualities of screening materials may be used momentarily, trouble soon develops. Superior wear resistance and minimum screen-blocking can only be obtained by utilization of screens of the class described when used with nodular media of the size indicated and when driven by impellers operating above about 2500 feet per minute linear velocity for energy transfer to the media.

Another major advantage of the screen described is that the area thereof is smooth and the grinding media in contact therewith is not restrained by movement into the screen openings during mill operation.

To assure proper spatial placement of screen area 75 in relation to the inside wall of vessel 7 a chamfered slot 77 about the inside area of the face of hatch-way 20 is adapted to position screen holder 60, assisted by mounting pins 80 and 80a, detailed in FIGURE 5. Mounting pins 80 and 80a are oppositely disposed in the vertical side walls of hatch-way 20. A centrally drilled brass nut 81 is tapped into each side wall of hatch-way 20. A drill rod 82 is fitted on the outside end with knurled knob 83, passes through nut 81 and is held under compression of spring 84 acting against washers 85 to cause rounded end 86 to extend interiorly beyond the interior wall of hatch-way 20; spring 84 is compressively held by pin 87 at right angles through drill rod 82. Forces outwardly applied on knobs 83 of mounting pins 80 increase tension on springs 84 and withdraw rod ends 86 from engagement in pin-receiving slots 90 to permit removal or re-insertion of screen holder 60 in hatch-way 20. Door 25 is brought home against hatch-way 20 opening 17 to provide a leakproof seal by closing door 25 and swinging door-bar end 38 into engagement with bolt 35. Nut 40 is adjusted to bring bar 29 into parallel relation to door 25. Knobs 54 are turned to bring plates 55 securely against door 25 face. Alternate tightening of nut 40 and knobs 54 maintaining parallel relationships provide a leakproof seal.

Returning to FIGURES 1 and 2 it will be observed that the upper cylinder casing 1 is provided with a peripheral flange 100 terminating its length. A mating flange 101 is adapted to be bolted thereto which mating flange provides means to close casing 1 at the top and supporting means 102 for a motor 103, a motor drive means operating through the usual power transmission means (not shown) to transfer torque to a vertical impeller shaft 110 supported by one or more thrust bearings 104 and 105. Vertical impeller shaft 110 has horizontally mounted casing impellers 115, 116, 117 and 118 which are co-axially fixed to the shaft in conventional manner. There may be one or more casing impellers similar to 115 to 118 mounted within the central cavity of casing 1 and the upper part of vessel 7. However, it is important to note that at least one screen impeller 119 is mounted within the screen receiving area covered by the hatch-way 20. This is essential to the cleaning and sweeping action of the nodular grinding media as it is impinged against the slotted separatory screen. It should also be observed that the screen impeller 119 is preferably of lesser diameter than the casing impellers 115 to 118 not aligned with a screen area. Less preferably, all the impellers may be reduced in diameter to that corresponding to the screen impeller as shown in the drawings. If the screen impeller 119 is of the same diameter as the casing impellers 115 to 118, as shown in the drawings, wear on the screen area is excessive. If no screen impeller is used production falls off to an objectionally low level and grinding media build-up about the screen becomes excessive. If the casing impellers 115 to 118 are reduced in size to the diameter of the screen impeller 119, as illustrated, then the through-put rate and the quality of the dispersion obtained suffers accordingly.

The screen impeller is preferably designed as shown, but may also be a cylinder, cone or truncated cone of somewhat greater depth. Less screen wear is thus obtained, but a correlative disadvantage is obtained in that less working surface for attritive action is provided.

In certain installations utilizing a 12 inch interior diameter casing the casing impellers were of 10½ inch diameter and the screen impellers were reduced to 9½ inch diameter without materially diminishing through-put rate, but materially reducing the rate at which the separatory screen was worn away and thus prolonged screen life. In a larger installation having a 17 inch interior diameter casing having 15½ inch diameter casing impellers the screen impeller diameter was reduced to 14½ inches without noticeable yield rate change and yet materially lengthened screen life. A series of tests in a production size mill showing effect of screen impeller diameters of as little as 1/16 of an inch less than casing impellers gave marked improvement in length of service from screens. These dimensions are illustrative of a practical size range.

In a continuous unit of the class described, at least one screen impeller 119 is essential. Not less than two and preferably three or more casing impellers 115 to 118 are desirable in a continuously operable mill. With only two casing impellers recycling is essential to obtain high quality paint dispersions. This is particularly true with difficultly de-agglomerated pigment and with but one single pass of material through the mill. As the number of casing impellers is increased, power requirements increase with very little corresponding advantages. The limitation upon the number of casing impellers is the length of the impeller shaft and the power available.

Particulate pigmentary solids to be dispersed in liquids are preferably pre-mixed for use in the continuous mill described and fed into the upper portion of casing 1 through conduit 125 or alternatively, through the side wall of casing 1 at 106. Nipples 127 and 128 provide egress and ingress means for fluids used to control the temperature of the mill casing jacket.

An important break-through in handling dispersions of pigments in water was made in relation to the mechanical design of the impellers. When flat, imperforated impellers units were employed, water pulps (dispersion of pigments in water) could not be passed through the mill. The production rate was reduced to practically zero in cases where liquid vehicles having no binder solids or non-volatile vehicle solids components (essential to the operation of prior art sand mills) were attempted to be used as liquid carriers for pigments to be treated.

Thus, by introducing perforations through the impellers, a significant increase in through-put rate was obtained in all cases, and pigmentary water pumps which could not be processed by prior art devices, became processable with the relatively minor change in the impeller units when used in combination with the apparatus as herein described.

Further investigations along this line provide out additional advantage if the perforations in the impellers were entered by drilling circular holes through the impeller thickness on an angle, preferably of about 45° as shown in FIGURE 8. Thus, the trailing edge 130 of the perforation at an angle of 45° with the top impeller face tends to force the grinding media downward and in the direction of liquid feed flow through the dispersion mill. Test results are included hereinafter, to illustrate the improvement obtained by this relatively simple innovation.

To illustrate the remarkable differences obtained, a single impeller in a jacketed casing of 11 inch inside diameter was rotated at 2140 feet per minute in one trial and at 2700 feet per minute peripheral velocity in another trial using four different impellers of 6" diameter. A carefully graded nodular glass grinding media was selected for these tests having a particle diameter between 1.0 and 1.22 mm. A series of batches of an interior semigloss blue enamel were made in accordance with the test having a standard enamel grind or dispersion wherein all solid particles were of less than 25 microns in diameter (6H-Hegman gauge). The blue enamel had the following composition (all parts given are by weight).

INTERIOR SEMI-GLOSS BLUE—ENAMEL #1

68 parts titanium dioxide
15 parts iron blue (milori blue)
17 parts chrome green
95 parts diatomaceous silica
3 parts aluminum stearate
512 parts 30% oil length soya-linseed glycerophthalate alkyl varnish (50% solids)
30 parts lead napthenate (10%)
14 parts manganese napthenate (2%)
104 parts mineral spirits

Test #1

PERIPHERAL SPEED—BELOW 2500 (2,140 F.P.M.)

| Impeller Type | Time to Reach 6H Grind (Hegman), minutes | Power Reg., kw. | Temp., ° F. |
|---|---|---|---|
| A. Imperforate | 50 | 9.52 | 94 |
| B. 8—1″ holes vertical | 40 | 1.56 | 92 |
| C. 8—1″ holes trailing edge L 45° forward | 30 | 1.68 | 94 |
| D. 8—1″ holes trailing edge L 45° rearward | 50 | 1.60 | 92 |

From the data of Test #1, it can be seen that an additional 10.5% power input into dispersion was possible with the holes sloped at 45° angle (trailing edge forward) to save 40% of the time necessary to produce a standard of quality dispersion.

Test #2

INCREASED PERIPHERAL SPEED OF 2,700 F.P.M.

| Impeller | Time to 6H, min. | HP., kw. |
|---|---|---|
| A. Imperforate impeller | 35 | 2.40 |
| B. 8—1″ holes—trailing edge 45° angle forward | 20 | 2.48 |

Here, with about 3¼% increase in power requirement over the prior art impeller, a time savings of over 42½% was obtained.

Repeat runs were made on the same test equipment using a chrome yellow oil modified alkyd enamel containing about 26% oil. Almost identical results were obtained.

Test #3

A plant production trial run is set forward and is of value in demonstrating the advance in the art utilizing the combination of the apparatus herein disclosed. A coarse liquid mixture was prepared as a slurry by mixing 556 parts of colloidal silica pigment (Santocel), 280 parts zinc stearate and 4000 parts of a 56% drying oil modified glycerophthalate resin of 50% solids in mineral spirits (a film-forming varnish vehicle) and 600 parts of mineral spirits to produce a coarse slurry.

A production small-ball mill unit of the class here described having a 15¼ inch diameter vertical casing and 6 imperforate impellers of 13¾ inches diameter spaced apart on a 40 inch shaft operating at a peripheral speed of 3200 feet per minute produced 150 gallons per hour of a fine dispersion from the coarse mixture or slurry described. (The mixture described is used ultimately as a flat varnish base.)

A series of vertical holes normal to each of the impeller faces of one inch diameter were drilled equidistantly apart through 5 of the impellers and the sixth impeller removed entirely from the unit. With all other factors the same, the production rate was increased to 400 gallons per hour, output with the same fine dispersion (40 microns, largest particle). The output was increased 166% over the original by the change.

Test #4

A water pulp containing about 10% on a dry basis of a copper phthalocyanine pigment was fed into a laboratory size dispersion mill of the class described herein but having imperforate solid disk impellers. Only a small trickle of through-put could be obtained. A plurality of vertical holes were drilled through the disks a convenient distance out from the center hole and equidistantly apart.

A second run was started, and a solid stream of an improved aqueous pulp dispersion having improved color and tinting strength was produced. By the means described, an apparatus otherwise inoperable for the purpose was made operative and successful pigment-in-water dispersions were produced.

NATURE OF THE GRINDING MEDIA

In the prior art devices, sand from Ottawa, Illinois, has been employed which appears to have two distinct properties. One of these is that the particles are nearly spherical and are uniformly available in a 20 to 40 mesh, U.S. Standard Sieve size, with very little variation above this range. A second property observed is that the media appears not to change in size during said milling use. It appears as a matter of experience that when one attempts to use the smaller size media, plugging and clogging of the separatory screens is a continuous problem, whereas, when larger diameter media is employed in conjunction with the slotted screen of less open area per unit of total area and a higher level of kinetic energy is imported to the media by a higher peripheral impeller speed, very little difficulty is experienced with screen plugging or blinding. With the added change in disk impellers to include cylindrically perforated units, the nature of the vehicle which may be used is no longer limited to liquids which contain film-forming solids. Strangely, when employing the larger diameter nodular media of glass, the media is observed to wear; very slowly at first and then, as the surface is affected, to wear more rapidly. Despite the wear, however, little blocking or screen plugging is noted until the nodular particles are less than about 0.85 mm. or will pass through a 20 mesh (U.S. Standard) sieve.

Some investigations have been made utilizing a variety of media, namely; some of vitreous nature including glass, some of ceramic nature including fused alumina of high specific gravity (3.6 to 3.8) and some which are of shotted metal including steel shot having a specific gravity above 7. Not too great a difference has been observed between the glass and ceramic products which are ideally suited to dispersions of white and light colored pigments, illustratively yellow, where metal discoloration is readily noted. However, when using steel shot within the particle size described herein, remarkable changes in behavior are observed. If experience is referred back to the standard steel ball mill as commonly used in the art versus the procelain lined pebble mill, there is found to be correlative results between steel and glass in the mills of this invention. For example, the time of milling in a porcelain lined ball-mill using French pebbles is considerably longer than milling the same product in a steel ball mill. It has likewise been found true in the mill herein described.

If a grinding media having a specific gravity of 3.5 is compared with a shotted metal alloy having a specific gravity of over 7, it will be observed that lesser volume of the latter will operate more rapidly under otherwise equivalent conditions to produce the same high quality of dispersion. Thus, the volume relationship between the slurry to be dispersed and the grinding media in the mill will vary in accordance with the density of the grinding media employed. It may be observed that greater care in use must be exercised in the dispersing mill of this invention when the high density metal alloys in shot form are employed.

The term "grinding" media is here used in more general than the strict technical sense, for in dispersing of pigmentary solids in liquids it is maintained by those who reason most theoretically that no actual grinding in the sense of reduction of actual ultimate particle size occurs in pigment dispersion, but that agglomerates of fine particles are merely broken apart. Electron microscope studies appear to confirm this view. The term "nodular grinding media" is here intended to refer to the more or less spherical small ball agents used in the mill to transfer energy from the impellers to the pigmentary particles which are de-agglomerated. Where color contamination is a problem glass and ceramic nodular media is preferred, but where color or metal contamination is not materially significant, shotted metal having a specific gravity above 7 (and preferably a Brinell hardness of over 600) will accomplish the same end faster and with smaller volumes of grinding media in the ball mill unit. The steel shot weighs on the order of 40 pounds per gallon while the equivalent size glass beads weigh on the order of 14 pounds per gallon. In use, then, less volume of steel shot can be expected to give higher efficiency. Normally, the active volume of the mill (the top impeller defining the upper level of activity) will be filled to 40% of the total with the less dense grinding media. With shotted metal alloy media, less than 40% of the active mill volume need be filled with the nodular grinding media.

THE NATURE OF THE SEPARATORY SCREEN

Figure 12:
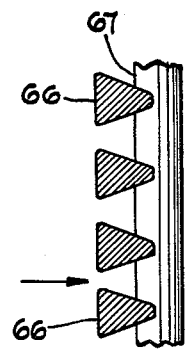
FIGURE 12 is an enlarged sectional view of a modification of the screen, the section illustrated along a line as shown and illustrated in FIGURE 11.

As indicated above, the nature of the screen used to separate the grinding media from the completed dispersion is a critical part of the combination. Woven screens which have from about 45 to 50% open area are inoperative when peripheral impeller speeds of in excess of 2500 feet per minute are employed as, contrary to prior art experience, grinding media under these conditions does decrease in size with use. Partly because of wear and partly because of the high energy imparted to the nodular grinding media, a standard screen will plug or blind quickly under conditions of use. However, if perforated plate type screens having slots running in the same direction as the rotation of the impellers are used, as shown in FIGS. 9, 10 and 11, the length 63 of the slots 61 are at least about ten times the width 62, and the ball or nodular media diameters are of the order of at least greater than 0.35 mm. and preferably from 0.40 to 0.70 mm. larger than the slot width, screen blinding is practically eliminated. Surprisingly, the slotted screen has from about 15% to about 30% open area 65, and yet the overall screen area of separation in the mill can be reduced from 360° of arc, or completely about the mill down to as low as for example, 15° of arc, depending upon the mill diameter, without materially reducing mill output when the small-ball ball mill as herein described is in operation. Thus, while the prior art utilized mill screens of from greater than 200° to 360° of arc to compensate for rapid screen plugging and assure practical production rates, it has been found that by reducing the percentage of openings to said area of the screen by as much as 35% and the area of the separatory screen by as much as 97%, production output can actually be increased, not only initially, but maintained over extended periods of small-ball ball mill operation. While not absolutely essential, it is preferred to utilize screens whose slots are slightly smaller on one side of the screen than the other as shown in FIGS. 11 and 12, as are now produced by electrolytic means in the case of FIG. 11. Alternatively, screens have been produced from wires of generally triangular cross-section, welded together to provide almost infinitely long slots, but slot widths of the order of 0.35 mm., the resultant welded and assembled screen unit (sectional view, FIG. 12) curved to the arc of the casing in which it is to be used. Sectional FIGURE 12 details the triangular cross section horizontal wire 66 welded to vertical support 67. The unlettered arrows of FIGURES 11 and 12 detail the direction of fluid flow from the mills through the screen when screen frame 60 is mounted in the mill.

From the foregoing description it is clear that a novel continuous ball mill is provided having an outer cylindrical casing the area of the inner volume of which may be subjected to temperature control and to violent bombardment. The casing may be horizontal but is preferably vertical in arrangement in space. The separatory screen retaining the grinding media in the mill and removing the nodular grinding media from the product need not be extensive to obtain throughput of fluent material and with this discovery, it became possible to have accessible screen areas in the base of the unit which are adapted for ready removal. By perforation of the impellers, fewer in number would produce greater outputs and also remove limitations previously requiring that the liquid be of film-forming nature. By overall changes in the nature of the separatory screen, the nature of the nodular grinding media and the energy imparted to the grinding media being increased to new levels, prior art problems with production rates, screen maintainence and replacement have been overcome. Longer screen life has been achieved by changes in the screen impeller in relation to the casing diameter and a new method of treating pigment-in-liquid slurries to produce fine dispersions has been made possible, independent of the nature of the liquid in which the pigment is to be dispersed. Additional increases in production rate have been made possible by minor changes in the axes of the impeller perforations which are of practical significance.

While we do not wish to be bound by theory, it is believed that the larger nodular grinding media (e.g. having a diameter of at least 0.85 mm.) having a higher kinetic energy (from impellers travelling faster than 2500 feet per minute) tend to be swept from the longer slots, whereas in more or less uniform screen (length and width) openings, the individual particles tend to set, as a jewel is set in its mounting, rather than to roll in and out of the groove of the elongated slots. That fast sweeping of the screen with an impeller means near the screen is essential to production can be demonstrated by removal of the screen impeller, whereupon production rates decline very rapidly.

While it is preferred to build the ball mills of this invention to operate with the impeller shaft in a depending and vertical manner to overcome many mechanical and wear problems, it is obvious that the ball mill can be made to operate with the mill casing and the impeller shaft in a horizontal plane, but with attendant seal and bearing problems. Such modification is contemplated and within the scope of the foregoing description and disclosure as theoretically, but not practically, equivalent. Other minor modifications and equivalent arrangement of parts is contemplated and within the spirit of the appended claims.

What we claim is:

1. A continuous ball mill which comprises a stationary hollow outer casing closed at one end having an inlet means at the opposite end thereof and outlet means at said closed end, said outlet means comprising a hollow chamber communicating at the casing outlet end with the interior of said casing and extending from said casing outwardly in but one direction, the free end and exterior opening of said outlet means reclosably sealed by fluid tight closure means, the interior of said outlet means adapted to removably receive and house a supporting screened frame, a screen frame, a slotted screen covering said screen frame and when in place in said outlet means said screen conforming to the curve of the interior wall of said casing, said closure means adapted to removably secure said frame in place; outlet port flow control means in said closure means; means for cooling said casing; a driven shaft rotatably mounted within said casing, a plurality of similar circularly perforated impellers coaxially attached to said shaft, at least one additional coaxial impeller on said shaft oppositely disposed from the screen face, the slot lengths in said screen face concentric with the periphery of said screen impeller; particulate nodular grinding media in said outer casing in a dry volume at least sufficient in quantity to contact said screen impeller; said media having a minimum particle diameter of at least 0.85 mm. but not greater than about 1.8 mm. and the slot widths in said screen at least 0.35 mm. in diameter smaller than said particle diameter; shaft driving means adapted to close the remaining open end of said casing and means to impart a peripheral velocity to the perforated impellers of, minimally, about 2500 lineal feet per minute.

2. The ball mill of claim 1 wherein the length of the slots of the slotted screen is at least ten times the width thereof and the open area of the slotted screen is less than about 30% but not less than about 15% of the total screen area.

3. The ball mill of claim 1 wherein the plurality of impellers are cylindrically perforated and the axes of said cylindrical perforations are normal to both faces of the impellers.

4. The ball mill of claim 1, wherein the plurality of impellers are cylindrically perforated and form ellipses with the top and bottom faces thereof, and the trailing edge of the ellipse of the top face slopes downwardly and rearwardly from said top impeller face.

5. The ball mill of claim 1 wherein the impellers oppositely disposed from the screen are of lesser diameter than the others of said impellers.

6. The ball mill of claim 1 wherein the nodular grinding media is of vitreous nature and fills from 40% to about 65% of the stationary hollow outer casing.

7. The ball mill of claim 1, wherein the nodular grinding media is glass.

8. The ball mill of claim 1, wherein the nodular grinding media is a shotted metal alloy having a specific gravity of above 7 and is not more than about 40% of the active casing volume.

9. The ball mill of claim 8, wherein the shotted metal alloy nodular grinding media is steel shot.

10. The ball mill of claim 1 wherein the nodular grinding media is of ceramic nature and is a fused alumina having a specific gravity of from 3.6 to 3.8 and fills from about 40% to about 60% of the active casing volume.

11. A process for the dispersion of a pigmentary solid in a liquid vehicle within an enclosed system which comprises continuously subjecting a downwardly directed main stream of a pre-mixed fluent slurry of the pigment in the liquid to bombardment essentially at right angles to the main stream flow with a mass of nodular grinding media, a maximum of 5% of which passes through an 18 mesh and none of which is retained on a 12 mesh U.S. Standard Sieve, continuously contacting and transferring energy to said nodular media from the rotating faces of a plurality of cylindrically perforated disks moved in a horizontal plane at a peripheral speed of not less than about 2500 feet per minute, and at the lower end of said moving stream, continuously centrifugally forcing removal of the finished liquid dispersion at a controlled flow rate from the grinding media in a plurality of individual streams of rectangular cross section, the width of which streams are less than the diameter of the grinding media and the length of which are a minimum of ten times said width, and at right angles to and outwardly from the downward main stream direction.

References Cited in the file of this patent

UNITED STATES PATENTS

| | | |
|---|---|---|
| Re. 10,382 | Alsing | Sept. 18, 1883 |
| 1,529,961 | Murphy | Mar. 17, 1925 |
| 1,640,885 | Curtis | Aug. 30, 1927 |
| 2,212,641 | Hucks | Aug. 27, 1940 |
| 2,399,051 | Maxson et al. | Apr. 23, 1946 |
| 2,581,414 | Hichberg | Jan. 8, 1952 |
| 2,615,692 | Muller | Oct. 28, 1952 |
| 2,855,156 | Hichberg et al. | Oct. 7, 1958 |

UNITED STATES PATENT OFFICE
CERTIFICATE OF CORRECTION

Patent No. 3,050,263                          August 21, 1962

Aaron Barkman et al.

It is hereby certified that error appears in the above numbered patent requiring correction and that the said Letters Patent should read as corrected below.

Column 6, line 72, for "alkyl" read -- alkyd --; column 7, in the table for "Test #1, third column, line 1 thereof, for "9.52" read -- 1.52 --.

Signed and sealed this 12th day of November 1963.

(SEAL)
Attest:
ERNEST W. SWIDER                          EDWIN L. REYNOLDS

Attesting Officer                          Acting Commissioner of Patents

Disclaimer and Dedication 3,050,263.—*Aaron Barkman*, and *Mike S. Fujimoto*, Chicago, and *Burnham R. Orwig*, Crete, Ill. CONTINUOUS SMALL-BALL BALL MILL AND METHOD FOR DISPERSING PIGMENTS IN LIQUID VEHICLES. Patent dated Aug. 21, 1962. Disclaimer and dedication filed Mar. 10, 1969, by the assignee, *The Sherwin-Williams Company*.

Hereby enters this disclaimer to all of the claims of said patent and dedicates the remainder of the term of the said patent to the Public.

[*Official Gazette September 23, 1969.*]